United States Patent
Sasaki et al.

(10) Patent No.: US 12,292,421 B2
(45) Date of Patent: May 6, 2025

(54) GAS CHROMATOGRAPH

(71) Applicant: Shimadzu Corporation, Kyoto (JP)

(72) Inventors: Kasumi Sasaki, Kyoto (JP); Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 293 days.

(21) Appl. No.: 18/082,912

(22) Filed: Dec. 16, 2022

(65) Prior Publication Data

US 2023/0221289 A1    Jul. 13, 2023

(30) Foreign Application Priority Data

Jan. 7, 2022 (JP) ................. 2022-001367
Jun. 6, 2022 (JP) ................. 2022-091311

(51) Int. Cl.
*G01N 30/30* (2006.01)
*G01N 30/02* (2006.01)

(52) U.S. Cl.
CPC ....... *G01N 30/30* (2013.01); *G01N 2030/025* (2013.01); *G01N 2030/3084* (2013.01)

(58) Field of Classification Search
CPC ............. G01N 30/30; G01N 2030/025; G01N 2030/3084
See application file for complete search history.

(56) References Cited

U.S. PATENT DOCUMENTS 3,422,603 A * 1/1969 Redmond, Jr. ........ G01N 30/30
219/400
2005/0258088 A1   11/2005 Botelho et al.

FOREIGN PATENT DOCUMENTS

| JP | H0886781 A | * | 4/1996 |
| JP | 4634444 B2 | | 2/2011 |
| JP | 2018-205079 A | | 12/2018 |
| TW | M359932 U | * | 7/2009 |

OTHER PUBLICATIONS

Hashimoto et al, "Development of Tip Vortex in Axial Fan with Short Bellmouth" The Japan Society of Mechanical Engineers, No. 058-1, pp. 337-338, Mar. 11, 2005 (2005).

* cited by examiner

*Primary Examiner* — Justin N Olamit
(74) *Attorney, Agent, or Firm* — Muir Patent Law, PLLC

(57) ABSTRACT

Provided is a gas chromatograph capable of efficiency circulating air in a column oven. The gas chromatograph is provided with a column oven, a heater, a fan, and a cylindrical member. The column oven accommodates a column. The heater heats the inside of the column oven. The fan has a blade that rotates about a rotation axis in the column oven, and sends air toward the column provided in the axial direction that is a direction along the rotation axis. The cylindrical member is arranged to accommodate at least a part of the fan in a state of being spaced apart from the column in the axial direction and surrounding an outer periphery of the fan along a rotational direction of the blade.

4 Claims, 8 Drawing Sheets

GAS CHROMATOGRAPH

CROSS-REFERENCE TO RELATED APPLICATIONS

This application claims priority under 35 U.S.C. § 119 to Japanese Patent Application No. 2022-001367 filed on Jan. 7, 2022 and Japanese Patent Application No. 2022-091311 filed on Jun. 6, 2022, the entire disclosures of which are incorporated herein by reference in its entirety.

BACKGROUND OF THE INVENTION

Field of the Invention

The present invention relates to a gas chromatograph.

Description of the Related Art

For example, in a gas chromatograph as disclosed in Patent Document 1 listed below, a fan for agitating air in a column oven is provided in a column oven. In the column oven, a heater and a column are provided.

PRIOR ART DOCUMENT

Patent Document
Patent Document 1: Japanese Unexamined Patent Application Publication No. 2018-205079

SUMMARY OF THE INVENTION

Problems to be Solved by the Invention

In a gas chromatograph, for example, when heating the inside of the column oven, both the fan and the heater are activated in a state in which the air inlet port and the air outlet port of the column oven are closed. In this case, as the air in the column oven is heated while being circulated, the inside of the column oven is heated. When the inside of the column oven is heated, the column is also heated.

Further, for example, when cooling the inside of the column oven, the fan is activated in a state in which the heater is deactivated and that the air inlet port and the air outlet port of column oven are opened. In this case, the air taken into the column oven through the air inlet port circulates in the column oven to deprive the heat in the column oven. Further, the heat deprived the air in the column oven is discharged through the air outlet port. With this, the inside of the column oven is cooled. Further, when the inside of the column oven is cooled, the column is cooled.

As described above, in the gas chromatograph, the fan is activated to heat or cool the column oven. The wind generated by the fan tends to spread in a direction (radial direction) away from the rotation axis of the fan. Therefore, the wind generated by the fan is small in the velocity component in the axial direction. Consequently, it takes a time to circulate the air in the column oven.

In addition, in the case of providing a plurality of columns in a column oven, there is a case in which the volume of the column oven is increased. In a case where the volume of the column oven is increased, the airflow in the column oven needs to be circulated efficiently in order to make the temperature distribution in the column oven uniform.

The present invention has been made in view of the above-described circumstances. An object of the present invention is to provide a gas chromatograph capable of efficiency circulating air in a column oven.

Means for Solving the Problem

According to the first aspect of the present invention, a gas chromatograph is provided with a column oven, a heater, a fan, and a cylindrical member. The column oven accommodates a column. The heater is configured to heat an inside of the column oven. The fan is provided with a blade that rotates about a rotation axis in the column oven. The fan is configured to send wind toward the column provided in an axial direction that is a direction along the rotation axis. The cylindrical member is arranged to accommodate at least a part of the fan in a state of being spaced apart from the column in the axial direction and surrounding an outer periphery of the fan along a rotational direction of the blade.

According to a second aspect of the present invention, a gas chromatograph is provided with a column oven, a heater, a fan, a rectifying member. The column oven accommodates a column. The heater is configured to heat an inside of the column oven. The fan is provided with a blade that rotates about a rotation axis in the column oven. The fan is configured to send wind toward the column provided in an axial direction that is a direction along the rotation axis. The rectifying member is configured to rectify the wind generated by the fan into a flow of wind centered on a rotation axis.

Effects of the Invention

According to the present invention, it is possible to efficiently circulate air in a column oven.

BRIEF DESCRIPTION OF THE DRAWINGS

The preferred embodiments of the present invention are shown by way of example, and not limitation in the accompanying figures.

EMBODIMENTS FOR CARRYING OUT THE INVENTION

In the following paragraphs, some preferred embodiments of the present invention will be described by way of example and not limitation. It should be understood based on this disclosure that various other modifications can be made by those skilled in the art based on these illustrated embodiments.

1. Configuration of Gas Chromatograph

Figure 1:
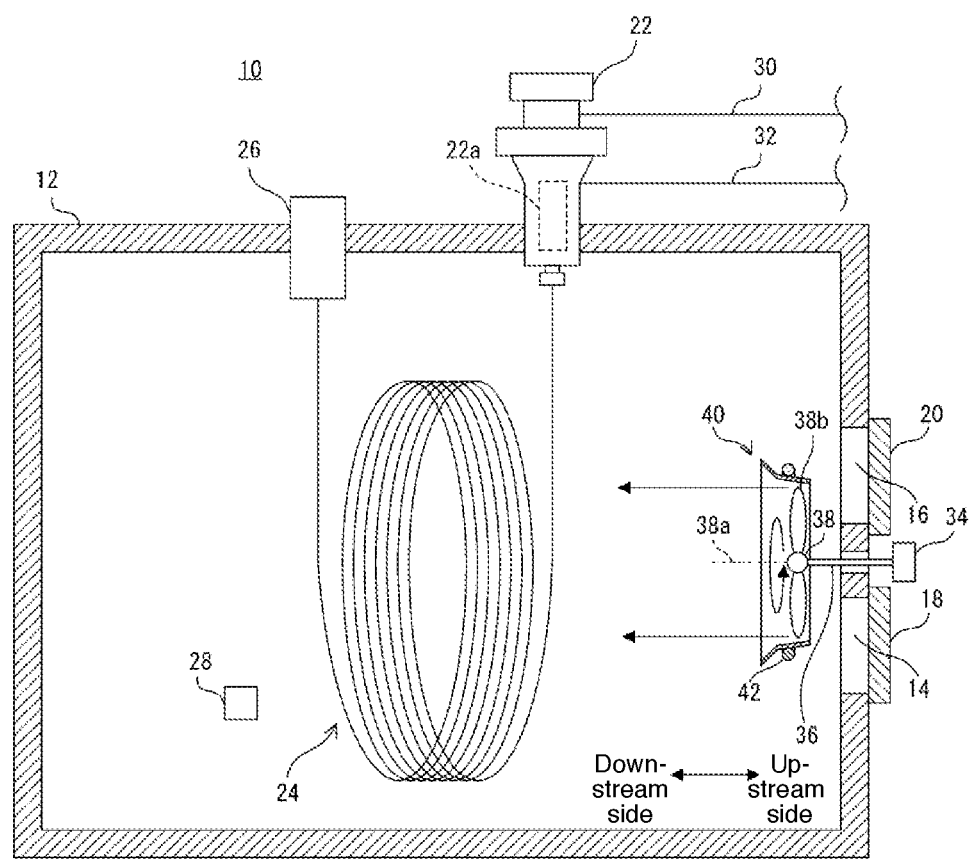
FIG. 1 is a schematic cross-sectional view showing a part of one example of a configuration of a gas chromatograph according to this embodiment.

FIG. 1 is a schematic cross-sectional view showing a part of one example of a configuration of a gas chromatograph 10 according to this embodiment. The gas chromatograph 10 is provided with a temperature-controllable column oven 12. The column oven 12 is provided with an air inlet port 14 and an air outlet port 16. The column oven 12 is further provided with an air inlet flap 18 for opening and closing the air inlet port 14 and an air outlet flap 20 for opening and closing the air outlet port 16.

Further, the gas chromatograph 10 is provided with a sample introduction unit 22, a column 24, a detector 26, a temperature sensor 28, and the like. These members are provided in the column oven 12. Specifically, the sample introduction unit 22 and the detector 26 are partially provided in the column oven 12.

The sample introduction unit 22 is a sample introduction unit for introducing a carrier gas and a sample gas into the column 24 and is provided with a septum (not shown). A sample vaporization chamber 22a is formed in the sample introduction unit 22.

Further, the sample introduction unit 22 is provided with a heater (not shown). A liquid sample introduced into the sample vaporization chamber 22a is vaporized by the heater to be served as a sample gas. Note that the sample is not limited to a liquid and may be a solid or a gas.

Furthermore, the sample vaporization chamber 22a is in communication with a gas supply flow path 30 and a split flow path 32. The gas supply flow path 30 is a flow path for supplying a carrier gas into the sample vaporization chamber 22a of the sample introduction unit 22.

The split flow path 32 is a flow path for discharging a part of the gas (a mixed gas of a carrier gas and a sample gas) in the sample vaporization chamber 22a to the outside at a predetermined split rate when introducing a carrier gas and a sample gas into the column 24 by a split introduction method.

That is, according to the sample introduction unit 22, a sample gas is introduced into the column 24 together with a carrier gas. Further, when the sample gas is introduced into the column 24, the sample components contained in the sample gas are separated by components by the column 24. Note that the column 24 is a general-purpose column.

Note that the form of a sample to be introduced into the sample introduction unit 22 is not particularly limited as long as a sample can be introduced from the sample introduction unit 22 to the column 24. As for the sample introduction unit 22, a sample introduction unit of a type suitable for a type of a sample is appropriately used. For example, in a case where the sample to be supplied to the sample introduction unit 22 is a gas, as the sample introduction unit 22, a sample introduction unit of a type in which no sample vaporization chamber 22a is formed is used.

The detector 26 is provided for sequentially detecting various components separated by the column 24. The detector 26 is configured by, for example, a hydrogen flame ionization detector (FID). Further, the temperature sensor 28 is provided to detect the temperature in the column oven 12.

2. Configuration of Fan and Therearound

The gas chromatograph 10 according to this embodiment is provided with, in addition to the column 24 and the like, a driving unit 34, a transfer mechanism 36, a fan 38, a cylindrical member 40, a heater 42, and the like.

Figure 2:
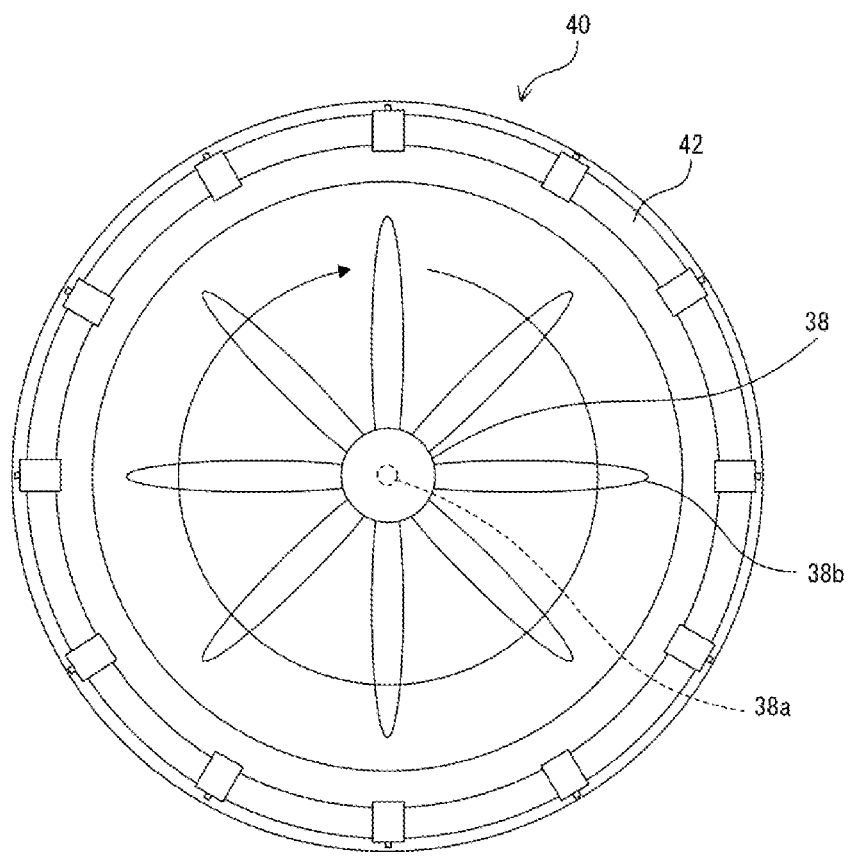
FIG. 2 is a schematic diagram showing one example of a configuration of a fan and its surroundings according to this embodiment.

FIG. 2 is a schematic diagram showing one example of the configuration of the fan 38 and therearound according to this embodiment. FIG. 2 shows the fan 38, etc., as viewed from the side of the transfer mechanism 36. Hereinafter, the configuration of the fan 38 and therearound according to this embodiment will be described with reference to FIG. 1 and FIG. 2.

The driving unit 34 is a general-purpose motor. The transfer mechanism 36 is a mechanism that transmits the rotational force generated by the driving unit 34 to the fan 38.

The fan 38 is a general-purpose fan and is provided in the column oven 12. The fan 38 rotates about the rotation axis 38a in the column oven 12. In this embodiment, the fan 38 is a propeller fan having a plurality of blades 38b extending radially centered on the rotation axis 38a. The fan 38 is arranged such that the rotation axis 38a extends horizontally. Note that the fan 38 has a plurality of blades 38b, and therefore, rotating the fan 38 about the rotation axis 38a means that the blades 38b of the fan 38 rotate about the rotation axis 38a. According to the fan 38, as shown in FIG. 1, the wind is sent toward the column 24 provided in the direction (axial direction) along the rotation axis 38a. However, in a case where the fan 38 is a propeller fan, the wind generated by the fan 38 tends to spread away from the rotation axis 38a of the fan 38 (in the radial direction).

The cylindrical member 40 is provided to accommodate the fan 38. The cylindrical member 40 accommodates at least a part of the fan 38 by enclosing an outer periphery of the fan 38 along the rotational direction of the blades 38b of the fan 38. The cylindrical member 40 is configured by, for example, a cylindrical member having a circular cross section perpendicular to the rotation axis 38a. The cylindrical member 40 is coaxially arranged centered on the rotation axis 38a of the fan 38 and surrounds the outer side of the fan 38 in an annular shape. The end of the blade 38b of the fan 38 is close to the inner periphery of the cylindrical member 40.

However, the cylindrical member 40 is not limited to a member having a circular shape in the cross section perpendicular to the rotation axis 38a, and may be a member having another shape, such as, e.g., a rectangular shape, in the cross section. In the example shown in FIG. 1, the cylindrical member 40 accommodates the entire fan 38. That is, the fan 38 is provided not to protrude from the cylindrical member 40 in the axial direction along the rotation axis 38a.

The cylindrical member 40 is spaced apart from the column 24 in the axial direction. That is, the column 24 is arranged outside the cylindrical member 40 in the column oven 12. Further, it can be said that the column 24 is arranged side by side with respect to the cylindrical member 40 spaced apart in the axial direction. Specifically, the column 24 is arranged on the downstream side of the wind generated by the fan 38 to be spaced apart from the cylindrical member 40. Between the cylindrical member 40 and the column 24, as a safety measure, a net, a grid, etc., for preventing the user from accidentally touching the fan 38, may be provided.

The heater 42 is provided to heat the inside of the column oven 12. In the example shown in FIG. 1 and FIG. 2, the heater 42 is mounted on the outer periphery of the cylindrical member 40 along the rotational direction of the blade 38b of the fan 38. That is, the heater 42 is attached to the outer side of the cylindrical member 40 to be integrally formed with the cylindrical member 40. The heater 42 includes, for example, a coil (not shown) formed by winding a metallic wire, and generates heat by energizing the coil. The heater 42 is provided not to protrude from the cylindrical member 40 in the axial direction along the rotation axis 38a. However, the heater 42 is not limited to a configuration in which a coil is provide, but may be a configuration in which an annular or arc-shaped heating element is provided along the outer periphery of the cylindrical member 40.

In such a gas chromatograph 10, for example, in a state in which the air inlet port 14 and the air outlet port 16 are closed, when the fan 38 and the heater 42 are activated together, the air is heated by the heater 42 while being circulated in the column oven 12. Accordingly, the inside of the column oven 12 is heated, and the column 24 is also heated. Note that the control of the heater 42 may be performed based on the detection temperature of the temperature sensor 28.

On the other hand, when the heater 42 is deactivated and the fan 38 is activated in a state in which the air inlet port 14 and the air outlet port 16 are opened, the air entrained from the air inlet port 14 circulates in the column oven 12 and deprives the heat in the column oven 12. The air deprived the heat in the column oven 12 is discharged from the air outlet port 16. Accordingly, the inside of the column oven 12 is cooled, and the column 24 is also cooled. The operations of the air inlet flap 18 and the air outlet flap 20 for opening and closing the air inlet port 14 and the air outlet port 16 may be controlled based on the detection temperature of the temperature sensor 28.

Further, in this embodiment, as described above, since the cylindrical member 40 surrounds the outer periphery of the fan 38, the blade tip vortex generated at the end of the blades 38b of the fan 38 is suppressed. Therefore, the wind generated by the fan 38 is less likely to spread in a direction (radial direction) away from the rotation axis 38a of the fan 38, and a decrease in velocity components in the axial direction of the wind is suppressed.

Therefore, according to the cylindrical member 40, it is possible to efficiently circulate the air in the column oven 12. With this, according to the cylindrical member 40, it is possible to efficiently heat or cool the inside of the column oven 12.

Further, in this embodiment, in order to further suppress the generation of the blade tip vortex, that is, in order to more efficiently circulate the air in the column oven 12, the fan 38 is arranged not to protrude from the cylindrical member 40 toward the downstream side of the wind generated by the fan 38. In particular, at least the end of the blade 38b is positioned not to protrude from the cylindrical member 40 toward the downstream side of the wind caused by the fan 38.

On the other hand, it may be configured such that the fan 38 protrudes from the cylindrical member 40 toward the upstream side of the wind generated by the fan 38. However, in this case, as described above, a part of the fan 38 is accommodated in the cylindrical member 40. That is, a part of the end of the blade 38b may project from the cylindrical member 40 toward the upstream side of the wind caused by the fan 38.

Further, in this embodiment, the heater 42 is provided on the outer periphery of the cylindrical member 40 as described above, and therefore, the cylindrical member 40 is interposed between at least a part of the column 24 and the heater 42. As a result, the propagation of the radiant heat from the heater 42 to at least a part of the column 24 is suppressed.

3. Configuration of Cylindrical Member

Figure 3:
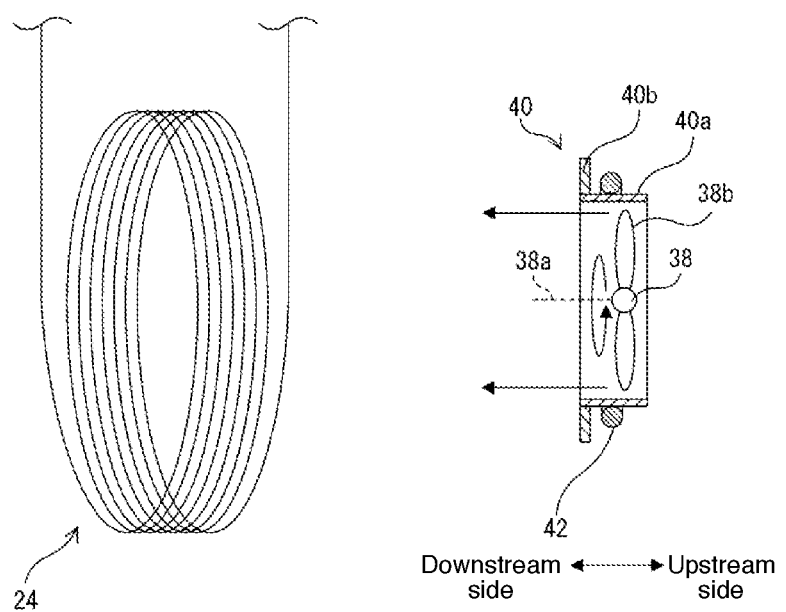
FIG. 3 is a schematic cross-sectional view showing one example of a configuration of a cylindrical member according to this embodiment.
Figure 4:
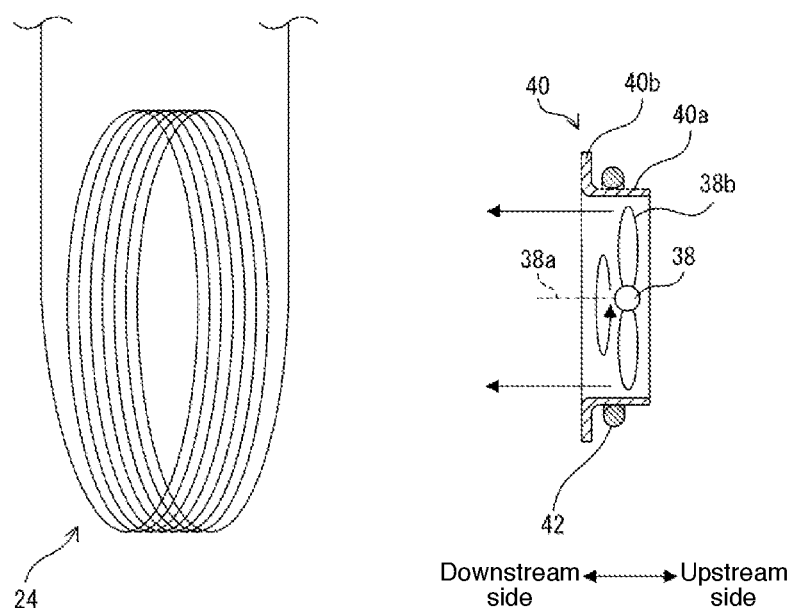
FIG. 4 is a schematic cross-sectional view showing another example of a configuration of a cylindrical member according to this embodiment.
Figure 5:
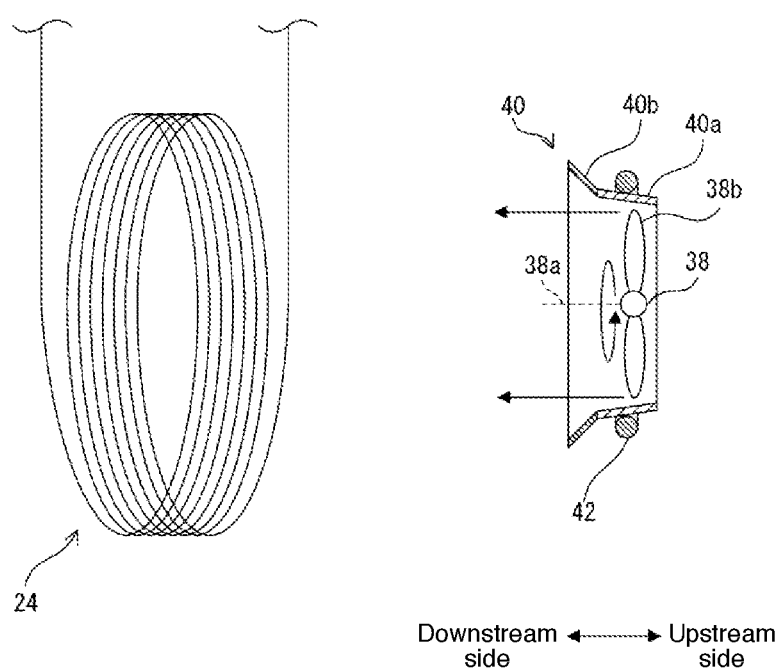
FIG. 5 is a schematic cross-sectional view showing still another example of a configuration of a cylindrical member according to this embodiment.

FIG. 3 is a schematic cross-sectional view showing one example of the configuration of the cylindrical member 40 according to this embodiment. FIG. 4 is a schematic cross-sectional view showing another example of the configuration of the cylindrical member 40 according to this embodiment. FIG. 5 is a schematic cross-sectional view showing still another example of the configuration of the cylindrical member 40 according to this embodiment.

As shown in FIG. 3 to FIG. 5, the cylindrical member 40 of this embodiment specifically includes a cylindrical portion 40a and a flange portion 40b. The cylindrical portion 40a accommodates at least a part of the fan 38 by surrounding the outer perimeter of the fan 38 along the rotational direction of the blade 38b of the fan 38.

The flange portion 40b is provided to the cylindrical portion 40a to protrude radially outward from the end of the cylindrical portion 40a on the downstream side of the wind generated by the fan 38. The flange portion 40b is a ring-shaped member arranged coaxially with the cylindrical portion 40a and having an outer diameter larger than the outer diameter of the cylindrical portion 40a. In the cylindrical member 40, the cylindrical portion 40a and the flange portion 40b may be formed by connecting separate members or may be formed by a single member.

Specifically, the heater 42 is provided on the outer periphery of the cylindrical portion 40a of the fan 38 along the rotational direction of the blade 38b of the fan 38. That is, the heater 42 is integrally formed with the cylindrical portion 40a by being attached to the outer side of the cylindrical portion 40a. Further, the heater 42 faces the column 24 via the flange portion 40b. Thus, the flange portion 40b is interposed between the column 24 and the 42.

In the example shown in FIG. 3, the cylindrical portion 40a extends straight along the axial direction. That is, in the axial direction, the inner diameter and the outer diameter of the cylindrical portion 40a do not change. In the outer periphery of the cylindrical portion 40a, the angle formed between the cylindrical portion 40a and the flange portion 40b is a right angle.

In the cylindrical member 40 shown in FIG. 4, the periphery of the part corresponding to the boundary between the cylindrical portion 40a and the flange portion 40b is rounded, as compared with the cylindrical member 40 shown in FIG. 3. That is, the inner peripheral surface of the cylindrical portion 40a is continuous with the flange portion 40b via a curved surface. In the cylindrical member 40 shown in FIG. 4, the cylindrical portion 40a and the flange portion 40b are formed by a single member.

Note that in the cylindrical member 40 as shown in FIG. 3 and FIG. 4, the angle formed between the cylindrical portion 40a and the flange portion 40b on the outer periphery of the cylindrical portion 40a may be an obtuse angle. That is, the flange portion 40b may be inclined to gradually approach the downstream side of the wind caused by the fan 38 (toward the column 24) as it approaches the distal end. However, the angle formed between the cylindrical portion 40a and the flange portion 40b may be set such that the heater 42 can face the column 24 via the flange portion 40b.

Further, as shown in FIG. 5, the cylindrical member 40 may be formed in a bell-mouth shape. In a case where the cylindrical member 40 is formed in a bell-mouth shape, the inner and outer diameters of the cylindrical portion 40a increase as they approach the downstream side (the column 24 side) of the wind caused by the fan 38.

In the example shown in FIG. 5, the angle formed between the cylindrical portion 40a and the flange portion 40b at the outer periphery of the cylindrical portion 40a is an obtuse angle. Further, the flange portion 40b is inclined to gradually approach the downstream side (toward column 24 side) of the wind caused by the fan 38 as it approaches the distal end. However, the angle formed between the cylindrical portion 40a and the flange portion 40b is set to such a degree that the heater 42 can face the column 24 via the flange portion 40b.

Further, in the same manner as the examples shown in FIG. 3 and FIG. 4, the flange portion 40b may be configured to extend in a direction perpendicular to the axial direction. For example, in a case where the cylindrical member 40 is formed in a bell-mouth shape, the perimeter of the part corresponding to the boundary between the cylindrical portion 40a and the flange portion 40b may be rounded, as shown in FIG. 4. In other words, the inner peripheral surface of the cylindrical portion 40a may be continuous to the flange portion 40b via a curved surface.

The cylindrical portion 40a is interposed between at least a part of the column 24 and the heater 42 in a direction intersecting the axial direction to suppress the propagation of the radiant heat from the heater 42 to the column 24. The flange portion 40b is interposed between the remaining part of the column 24 and the heater 42 in the axial direction to suppress the propagation of the radiated heat from the heater 42 to the column 24. That is, in a case where the cylindrical member 40 includes the cylindrical portion 40a and the flange portion 40b, the propagation of the radiant heat from the heater 42 to the entire column 24 is suppressed.

As described above, in a case where the cylindrical member 40 suppresses the propagation of the radiated heat from the heater 42 to the column 24, it is possible to prevent the temperature of the column 24 from being biased when the column 24 is heated as the column oven 12 is heated.

Note that in a case where the cylindrical member 40 is formed in a bell-mouth shape, the blade tip vortex generated at the end of the blade 38b of the fan 38 is further suppressed. In other words, the circulation of the air in the column oven 12 can be performed more efficiently. Therefore, the cylindrical member 40 is preferably formed in a bell-mouth shape.

Further, considering only the point of view of suppressing the radial direction spread of the wind caused by the fan 38, the heater 42 is not required to be provided at the cylindrical member 40. For example, the heater 42 may be provided at another location in the column oven 12 or may be provided outside the column oven 12.

Further, in this embodiment, the fan 38 is accommodated in the cylindrical member 40, but the column 24 or the like is not accommodated in the cylindrical member 40. In the column oven 12, since the outside of the cylindrical member 40 is brighter and wider than the inside of the cylindrical member 40, the operation in the column oven 12, specifically, the replacement of the column 24 or the like, can be easily performed in a case where the column 24 or the like is not accommodated in the cylindrical member 40.

4. Another Embodiment

Figure 6:
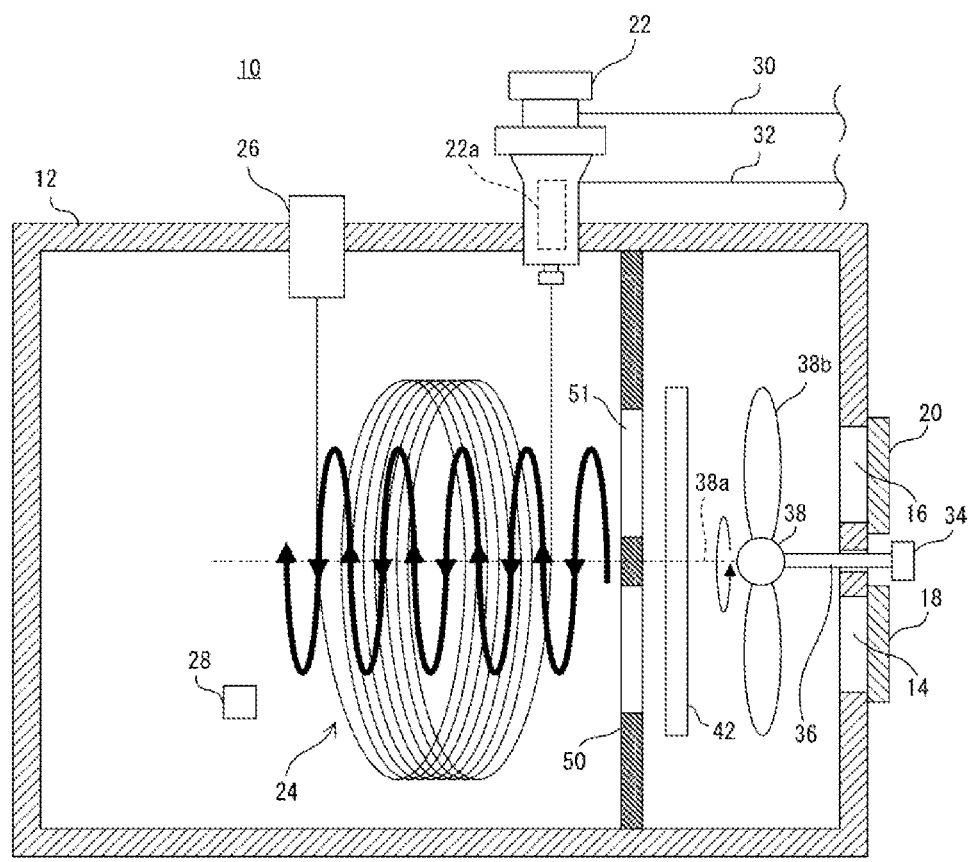
FIG. 6 is a schematic cross-sectional view showing a part of one example of a configuration of a gas chromatograph according to another embodiment.

FIG. 6 is a schematic cross-sectional view showing a part of one example of a configuration of a gas chromatograph 10 according to another embodiment. In the gas chromatograph 10, only the configuration around the fan 38 is different from that of the embodiment shown in FIG. 1, and the other configurations are the same as those of the embodiment shown in FIG. 1. Therefore, the same reference symbol is assigned to the same configuration in the drawings, and the detailed explanation thereof will be omitted.

In the example shown in FIG. 6, a heater 42 is provided between the fan 38 and the column 24. That is, the heater 42 is arranged on the downstream side of the wind generated by the fan 38, and the column 24 is arranged on the further downstream side. The heater 42 is formed in, for example, a mesh-like or spiral shape, and is arranged to face the blade 38b of the fan 38 in front of the blade.

Further, in the example shown in FIG. 6, a rectifying member 50 is provided between the heater 42 and the column 24. The rectifying member 50 is spaced apart from the column 24 in a direction (axial direction) along the rotation axis 38a of the fan 38. The rectifying member 50 is provided with air vents 51, so that the air generated by the fan 38 is rectified by passing through the air vents 51 and guided to the column 24. Note that it is not limited that the heater 42 is provided between the fan 38 and the rectifying member 50. But, the heater 42 may be provided between the rectifying member 50 and the column 24, or elsewhere.

The wind generated by the fan 38 is rectified by passing through the air vents 51 of the rectifying member 50 into a flow of wind centered on the rotation axis 38a. The "wind flow centered on the rotation axis 38a" denotes, for example, a flow of wind swirling centered on the rotation axis 38a, and may be a flow of wind swirling in a spiral shape.

The rectifying member 50 is, for example, a plate-shaped member and functions as a partition wall that partitions a space in the column oven 12. That is, the rectifying member 50 may be configured such that a first space in which the fan 38 is arranged and a second space in which the column 24 is arranged are partitioned and that the first space and the second space are communicated to each other via the air vents 51. In this case, the heater 42 may be arranged in the first space or may be arranged in the second space. Note that it is not limited to such a configuration that the space in the column oven 12 is completely partitioned by the rectifying member 50, and but may be configured such that another air vent is provided around the rectifying member 50.

Figure 7:
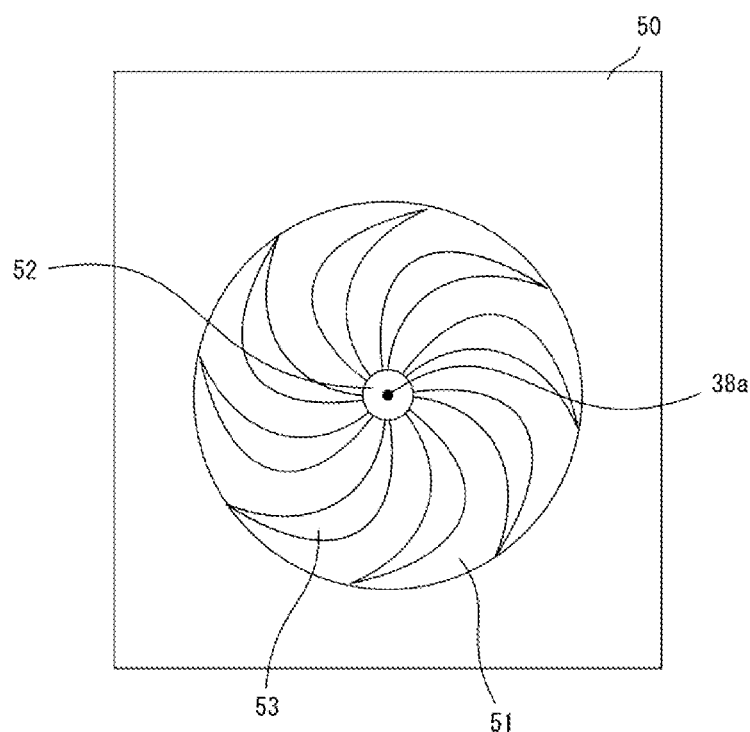
FIG. 7 is a schematic front view showing one example of a configuration of a rectifying member shown in FIG. 6.

FIG. 7 is a schematic front view showing one example of a configuration of a rectifying member 50 shown in FIG. 6. In this embodiment, a plurality of air vents 51 is formed radially centered on the rotation axis 38a of the fan 38 in the central portion of the plate-shaped rectifying member 50.

Each of the plurality of air vents 51 is formed to extend in an arc shape from a central portion 52 (a part on the rotation axis 38a) of the rectifying member 50, and is formed in a vortex shape centered on the rotation axis 38a. Specifically, arc-shaped ribs 53 are radially formed from the central portion 52, so that an arc-shaped air vent 51 is formed between the ribs 53.

Note that the rectifying member 50 is not limited to the shape shown in FIG. 7 as long as it can rectify the wind generated by the fan 38 into the wind flow centered on the rotation axis 38a. The flow of the wind centered on the rotation axis 38a generated by the rectifying member 50 may be clockwise or counterclockwise with respect to the rotation axis 38a.

Figure 8:
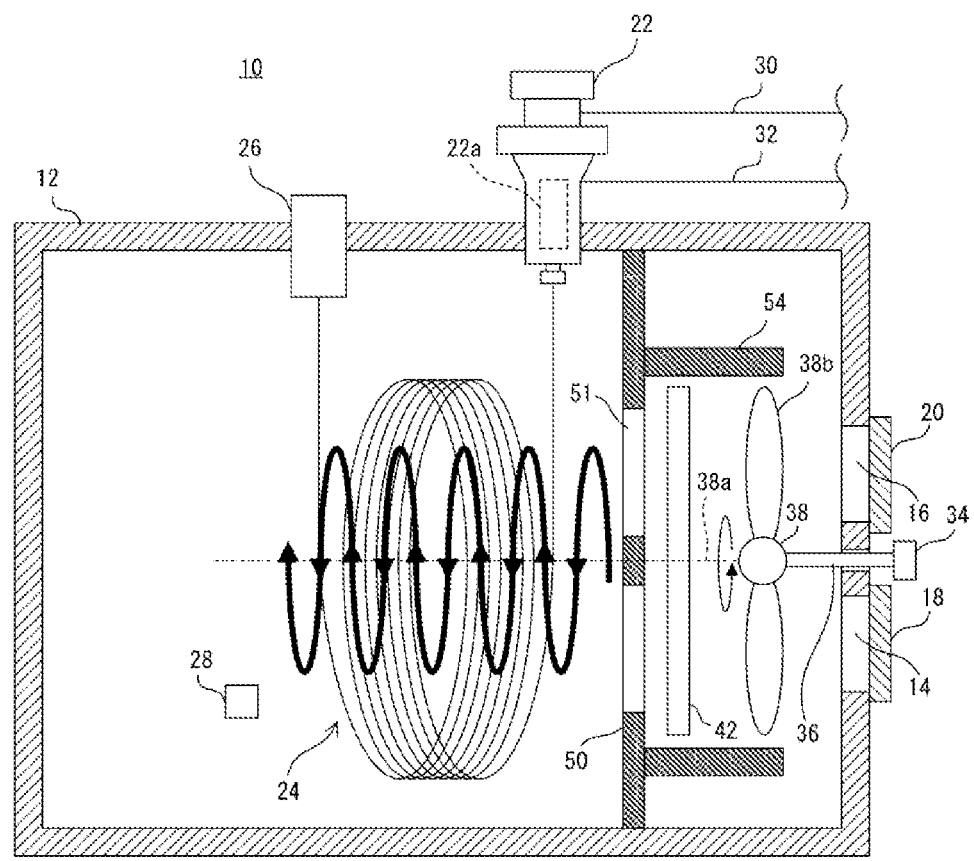
FIG. 8 is a schematic cross-sectional view showing a modification of the gas chromatograph shown in FIG. 6.

FIG. 8 is a schematic cross-sectional view showing a modification of the gas chromatograph shown in FIG. 6. In this example, unlike the example shown in FIG. 6, only the point that the cylindrical member 54 for guiding the wind generated by the fan 38 to the rectifying member 50 is provided is different. The other configurations are the same as those of the example shown in FIG. 6. Therefore, the same reference symbol will be assigned to the same configuration in the drawings, and the detailed explanation thereof will be omitted.

The cylindrical member 54 covers the outer periphery of the fan 38 along the blades 38b. Specifically, the front (upstream) end of the cylindrical member 54 is radially opposed to the blade 38b, and the rear (downstream side) end thereof is proximate to or connected to the rectifying member 50. With this configuration, at least a part of the fan 38 is covered with the cylindrical member 54, and the wind generated by the fan 38 is guided toward the rectifying member 50 through the space (wind tunnel) in the cylindrical member 54.

The cylindrical member 54 is not limited to the configuration that the cylindrical member 54 covers all of the fan 38, and may be a configuration in which the cylindrical member 54 covers only a part thereof. The cylindrical member 54 is preferably proximate to the distal end of the blade 38b, but not limited thereto. The cylindrical member 54 may be provided along the inner surface of the column oven 12, for example. Further, the cylindrical member 54 is not limited to a cylindrical shape, and may have other shapes. In the example shown in FIG. 8, the heater 42 is provided inside the cylindrical member 54, but the present invention is not limited thereto. The heater 42 may be provided outside the cylindrical member 54.

5. Aspects

It will be understood by those skilled in the art that the plurality of exemplary embodiments described above is illustrative of the following aspects.

(Item 1)

A gas chromatograph according to one aspect of the present invention is provided with:
- a column oven accommodating a column;
- a heater configured to heat an inside of the column oven;
- a fan provided with a blade that rotates about a rotation axis in the column oven, the fan being configured to send wind toward the column provided in an axial direction that is a direction along the rotation axis; and
- a cylindrical member arranged to accommodate at least a part of the fan in a state of being spaced apart from the column in the axial direction and surrounding an outer periphery of the fan along a rotational direction of the blade.

According to the gas chromatograph as recited in the above-described Item 1, the wind generated by the fan is less likely to spread away from the rotation axis of the fan, so that the air in the column oven can be circulated efficiently. When heating or cooling the inside of the column oven, the inside of the column oven is circulated by the fan. Therefore, the inside of the column oven can be efficiently heated or cooled as long as the inside of the column oven can be efficiently circulated.

(Item 2)

In the gas chromatograph as recited in the above-described Item 1, it may be configured such that the fan is arranged not to protrude from the cylindrical member toward a downstream side of the wind generated by the fan.

According to the gas chromatograph as recited in the above-described Item 2, since the wind generated by the fan is less likely to spread further away from the rotation axis of the fan, the air in the column oven can be circulated more efficiently.

(Item 3)

In the gas chromatograph as recited in the above-described Item 1 or 2, it may be configured such that the heater is mounted on an outer periphery of the cylindrical member along the rotational direction of the blade.

According to the gas chromatograph as recited in the above-described Item 3, the propagation of the radiant heat from the heater to at least a part of the column is suppressed. Further, when heating the column, the propagation of the radiant heat from the heater is suppressed, and therefore, it is possible to prevent the heat of the column from being biased when the column oven is heated.

(Item 4)

In the gas chromatograph as recited in the above-described Item 3, it may be configured such that
- the cylindrical member includes a cylindrical portion and a flange portion,
- the cylindrical portion accommodates the at least a part of the fan in a state of surrounding the outer periphery of the fan along the rotational direction of the blade,
- the flange portion is provided to the cylindrical portion to protrude radially outward from an end of the cylindrical portion on a downstream side of the wind generated by the fan, and
- the heater is mounted on the outer periphery of the cylindrical portion along the rotational direction of the blade to face the column via the flange portion.

According to the gas chromatograph as recited in the above-described Item 4, the propagation of the radiation heat from the heater to the entire column is suppressed. As a result, when the column is heated in accordance with the heating of the column oven, the temperature of the column can be further suppressed from being biased.

(Item 5)

In the gas chromatograph as recited in the above-described Item 4, it may be configured such that the cylindrical member is formed in a bell-mouth shape.

According to the gas chromatograph as described in the above-described Item 5, since the blade tip vortex generated at the end of the blade of the fan is further suppressed, it is possible to more efficiently circulate the air in column oven.

(Item 6)

A gas chromatograph according to a second aspect of the present invention, is provided with:
- a column oven accommodating a column;
- a heater configured to heat an inside of the column oven;
- a fan provided with a blade that rotates about a rotation axis in the column oven, the fan being configured to send wind toward the column provided in an axial direction that is a direction along the rotation axis; and
- a rectifying member configured to rectify the wind generated by the fan into a flow of wind centered on the rotation axis.

According to the gas chromatograph as recited in the above-described Item 6, since the wind generated by the fan is rectified into the wind flow centered on the rotation axis, the ratio of the wind in the axial direction is increased, and therefore, the agitation efficiency of the air in the column oven is improved. As a result, the air in the column oven can be circulated efficiently, so that the air in the column oven can be uniformly distributed. Further, since the ratio of the wind in the axial direction is increased, even if the rotation speed of the fan is decreased, it is possible to uniformly distribute the temperature of the air in the column oven. Therefore, it contributes to prolonging the life of the fan, reducing the power consumption, and reducing the noise, as well as improving the cooling efficiency in the column oven, which in turn contributes to shortening the cooling time.

(Item 7)

In the gas chromatograph as recited in the above-described Item 6, it may be configured such that the gas chromatograph is further provided with a cylindrical member configured to direct the wind generated by the fan toward the rectifying member, the cylindrical member accommodating at least a part of the fan in a state of surrounding an outer periphery of the fan along a rotational direction of the blade.

According to the gas chromatograph described in the above-described Item 7, since the wind generated by the fan can be efficiently guided to the rectifying member, a strong wind flow centered on the rotation axis can be generated. Therefore, the stirring efficiency of the air in the column oven is further improved, and therefore, the air in the column oven can be circulated more efficiently.

(Item 8)

In the gas chromatograph as recited in the above-described Item 6 or 7, it may be configured such that the rectifying member has an air vent formed in a spiral shape centered on the rotation axis.

According to the gas chromatograph as recited in the above-described Item 8, it is possible to efficiently convert the wind generated by the fan into the wind flow centered on the rotation axis via the air vent formed in a vortex shape centered on the rotation axis.

The invention claimed is:

1. A gas chromatograph comprising:
a column oven accommodating a column;
a heater configured to heat an inside of the column oven;
a fan provided with a blade that rotates about a rotation axis in the column oven, the fan being configured to send wind toward the column provided in an axial direction that is a direction along the rotation axis; and
a cylindrical member arranged to accommodate at least a part of the fan in a state of being spaced apart from the column in the axial direction and surrounding an outer periphery of the fan along a rotational direction of the blade,
wherein the heater is mounted on an outer periphery of the cylindrical member along the rotational direction of the blade.

2. The gas chromatograph as recited in claim 1,
wherein the fan is arranged not to protrude from the cylindrical member toward a downstream side of the wind generated by the fan.

3. The gas chromatograph as recited in claim 1,
wherein the cylindrical member includes a cylindrical portion and a flange portion,
wherein the cylindrical portion accommodates the at least a part of the fan in a state of surrounding the outer periphery of the fan along the rotational direction of the blade,
wherein the flange portion is provided to the cylindrical portion to protrude radially outward from an end of the cylindrical portion on a downstream side of the wind generated by the fan, and
wherein the heater is mounted on the outer periphery of the cylindrical portion along the rotational direction of the blade to face the column via the flange portion.

4. The gas chromatograph as recited in claim 3,
wherein the cylindrical member is formed in a bell-mouth shape.

* * * * *